Figure 3:
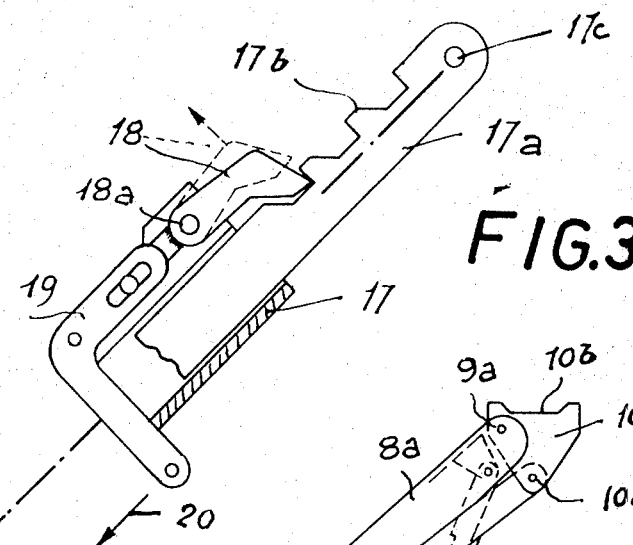

United States Patent [19]
Tranchero

[11] 3,758,076
[45] Sept. 11, 1973

[54] MOBILE LIFT APPARATUS PARTICULARLY FOR MOTOR VEHICLES WITH AUTOMATIC SAFETY DEVICE

[76] Inventor: Jacques Tranchero, via Villanovetta 2, Piasco, Italy

[22] Filed: Apr. 8, 1971

[21] Appl. No.: 132,481

[30] Foreign Application Priority Data
Apr. 8, 1970 Italy.............................. 68171 A/70

[52] U.S. Cl................................................. 254/8 R
[51] Int. Cl....................................... B60p 1/48
[58] Field of Search ................. 254/8, 93, 124, 130, 254/2, 7

[56] References Cited
UNITED STATES PATENTS
2,998,224  8/1961  Reisig................................. 254/8 R
1,447,242  3/1923  Fritz................................... 254/93 H FOREIGN PATENTS OR APPLICATIONS
1,251,673  12/1960  Italy.................................... 254/8 R
1,334,344  7/1963  France................................ 254/124

Primary Examiner—Othell M. Simpson
Assistant Examiner—Robert C. Watson
Attorney—Clario Ceccon

[57] ABSTRACT

A mobile lift, particularly for use with heavy vehicles is provided with first and second rectangular frame members and wheels for journalling the first frame member. The second rectangular frame member is comprised of a parallel linkage system and is pivotly mounted at one end thereof on the first frame member. The other end of the second frame member includes a pair of laterally spaced apart ears that are pivotly secured to a pair of supporting brackets each of which has one surface that is maintained in the horizontsl position at all times. A hydraulic cylinder is pivotly mounted on the first frame and the piston of the cylinder is pivotly mounted to the second frame. A pair of laterally spaced apart telescoping racks are pivotly mounted on the first frame concentrically with the cylinder and a pawl cooperates with each of the racks. Lever means are used for controlling the movement of the pawls in opposition to spring means that normally maintain the pawls in engagement with the racks.

1 Claim, 3 Drawing Figures

PATENTED SEP 11 1973 3,758,076

MOBILE LIFT APPARATUS PARTICULARLY FOR MOTOR VEHICLES WITH AUTOMATIC SAFETY DEVICE

The present invention relates to a high power hydraulic jack provided with a base frame mounted on wheels and designed to be use, particularly but not exclusively, to partially lift motor vehicles as trucks, tractor trucks and similar.

The hydraulic lift apparatus according to the invention is mainly characterized in that when it is in the completely lowered condition, all its members including the terminal bracket designed to engage and lift the load, assume such positions as to be contained within the height of the base perimetral frame which, in turn, has a vertical dimension reduced to the minimum in order to may be easely introduced under the chassis of the motor vehicles to be lifted.

Another particular feature of the hydraulic lift apparatus according to the invention derives from the fact that the cylinder and piston unit co-operates constantly with a pair of rugged telescopic racks controlled by correspondent pawls; the angular movement of the hydraulic cylinder-piston is followed by racks which, in the assembly lifting phase and when the same is in the maximum elevation position, prevent any possible lowering movement which may derive from accidental causes.

Figure 1:
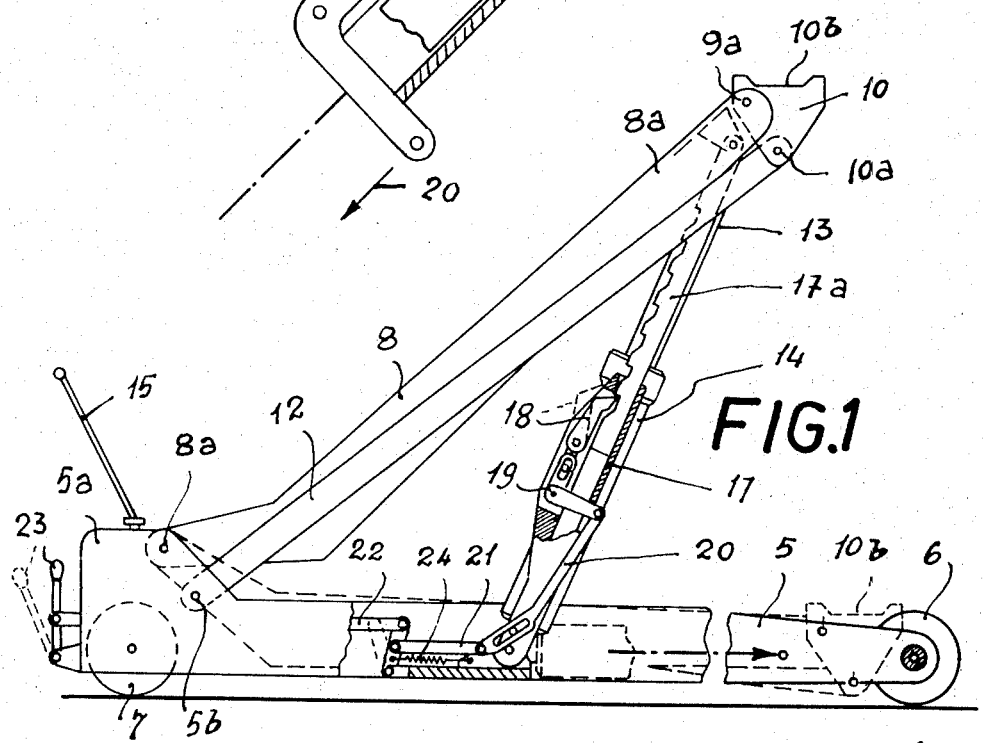
Figure 2:
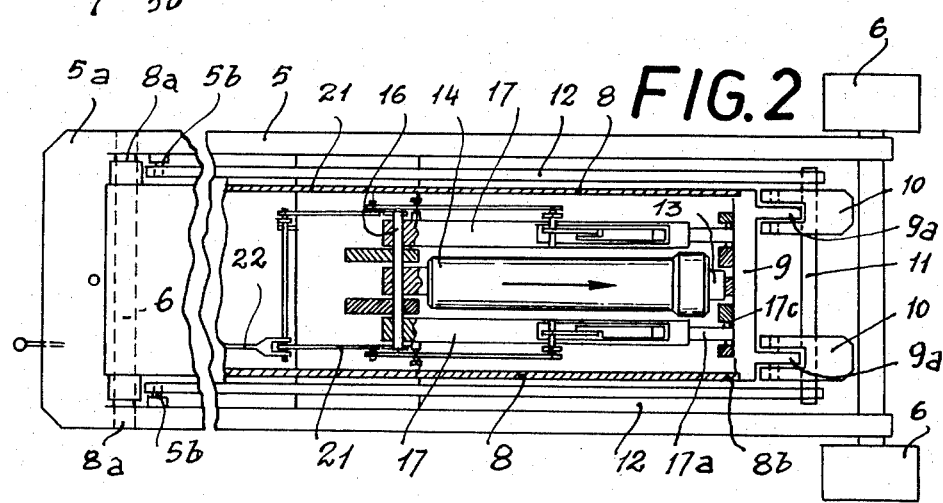

Further and more clear particular features of said lift apparatus will result from the following specification referred to the accompanying demonstrative and not limiting drawing, wherein:

FIG. 1 is a side view of the lift apparatus in the maximum elevation position;

FIG. 2 a top plan view of the same;

FIG. 3 is an enlarged detail of one of the two safety racks.

The lift apparatus is formed by a strong metal frame 5 having a rectangular perimeter and mounted on small transfer wheels 6, 7; wheel 7 is pivoted so as to easely orientate the assembly during its displacements.

End 5a of frame 5 suitably shaped, carries by means of articulations at 8a, around the strong pin 6, the ends of the pair of arms 8 having their opposed ends 8b integral with the cross member 9; said cross member 9 is substantially fork shaped and each of its branches or ears 9a is articulated to the branches of a strong supporting bracket 10. As shown on FIG. 1, the brackets 10, seen from the side, have a triangular outline with a vertex 10a facing downward; on said vertex 10a are articulated, for each bracket and about a pin 11, the ends of compensating tie rods 12 which, with their opposed ends, are articulated at 5b to section 5a of frame 5. In these conditions, the angular movement of arms 8 and tie rods 12 about their respective pivot points 8a and 5b, during any lowering and/or lifting phase of the brackets 10 with respect to the frame 5, does not modify the position of same brackets which remain with the base 10b always horizontal due to the structure of the kinematic parts and the pivots 9a and 10a of arms 8,of respective tie rods 12 which engage two vertex of the triangle 10.

The end of piston 13 is articulated against cross member 9 and is actuable by the hydraulic cylinder 14 which may be fed by a fluid pump and tank contained in the box-shaped section 5a of frame 5. 15 indicates the control lever for a hydraulic distributor, not shown.

The base of cylinder 14 is pivoted by means of pin 16 on the sides of frame 5 together with the pair of racks 17, located one on each side of the cylinder 14. Each rack comprises a tubular branch 17 having a polygonal cross section, within which a second branch 17a may slide but not rotate; branch 17 is provided with teeth 17b facing upward and which may be engaged by a correspondent pawl 18. The free end of the tubular branches 17, as already stated, is engaged by pin 16 and the external end of branches 17a is pivoted at 17c to the cross member 9.

A pawl 18 pivoted at 18a on a projection 17d of the correspondent branch 17 may be released, through linkages 19, 20, 21, 22 and the control lever 23, from the teeth of the correspondent rack against the resilient reaction of spring 24.

The operation of the lift apparatus is the following:

When, as an example, it is desired to lift for maintenance or repairs the front or the rear part of a truck, a tramway car or other heavy vehicle, the first operation is to lock the vehicle wheels opposed to those which are located near the end to be lifted while the lift apparatus, completely lowered, that is, in the condition shown by dotted lines on FIG. 1, with a limited height, is introduced under the part or end of the vehicle to be lifted. Then the hydraulic pump is actuated, feeding the cylinder 14 which actuates piston 13 which gradually brings the assembly in the position represented by full lines on FIG. 1, together with the load weighing on brackets 10.

As the angle formed between the frame 5 and the mobile parts of the lift apparatus increase, the pawls 18 engage the teeth of the correspondent telescopic racks 17 assuring the impossibility of a violent and accidental lowering of the assembly and the relative load.

It is obvious that on shaft 11 and/or brackets 10 carried by the same, various fittings may be mounted to make more safe and easy the charging of different loads and/or to engage particular parts of a motor vehicle, a vehicle, a machine or any load.

The lift apparatus according to the invention perfectly capable and specifically manufactured for the lifting of great loads, takes up a relatively limited space; due to its reduced height dimension when it is completely lowered said dimension is reduced to about 20 cm and it may be introduced under loads lying at a limited height from the ground; it may be easely transported and offers the widest operation guaranties against any possibility of an accidental lowering of its kinematic assembly.

Obviously, the present invention is not limited to the demonstrative embodiment described and represented and it may be further improved and actuated with possible structural variants.

I claim:

1. A mobile lift, particularly for the lifting of heavy vehicles, said lift comprising:
    a. a first, rectangular base frame;
    b. wheel means journalled in said base frame for providing mobility thereto;
    c. a second, rectangular frame pivotly mounted at one end thereof on said first frame, the other end of said second frame including a pair of laterally spaced apart ears;
    d. a supporting bracket pivotly secured to each said ear;
    e. a transverse pin pivotly supporting said brackets;

f. a hydraulic piston and cylinder pivotly secured to said second and said first frames, respectively;

g. a pair of laterally spaced apart, telescoping racks, each said rack having first and second ends, said first end of each said rack being mounted in pivotal relationship with said cylinder on said first frame and said second end of each said rack being mounted in pivotal relationship with said piston on said second frame;

h. a pawl cooperating with each said rack;

i. lever means for controlling the movement of said pawl; and j. spring means for normally resisting the movement of said lever means so as to maintain said pawls in engagement with said racks.

* * * * *